3,161,634
PROCESS OF MAKING N-ACYL DERIVATIVES OF 6-AMINO-PENICILLANIC ACID
William Andersen, Lyngby, Denmark, assignor to Novo Terapeutisk Laboratorium A/S, Copenhagen, Denmark, a joint-stock company of Denmark
No Drawing. Filed Dec. 18, 1961, Ser. No. 160,278
Claims priority, application Denmark, Dec. 21, 1960, 5,063/60
7 Claims. (Cl. 260—239.1)

It is known to produce N-acyl derivatives of 6-amino-penicillanic acid by reacting this acid with a halide, an anhydride, or a mixed anhydride of the acid desired to be bound to the amino group of the 6-amino-penicillanic acid.

Although, in most instances, it has been proposed to carry out the acylation in an aqueous medium it has also been proposed to perform the acylation in an organic solvent using the triethyl ammonium salt of 6-amino-penicillanic acid.

The present invention relates to a process of making N-acyl derivatives of 6-amino-penicillanic acid, said process being of the type in which a solution of a quaternary ammonium salt of 6-amino-penicillanic acid in an organic solvent is reacted with an acylating agent, and the object of the invention is to make use of an acylating agent of an entirely different type than the one hitherto used as well as to accomplish the acylation and the isolation of the N-acyl derivatives formed under such conditions that the N-acyl-derivatives are obtained in good yield and are of high purity.

The N-acyl derivatives of 6-amino-penicillanic acid with the preparation of which the present invention is concerned have the general formula $$C_6H_5O-\underset{R^2}{\overset{R^1}{\underset{|}{\overset{|}{C}}}}-CO-NH-CH-\overset{S}{\underset{CO-N}{\overset{}{\underset{|}{CH}}}}\overset{}{\underset{CHCOOR'}{\overset{C(CH_3)_2}{}}}$$

where R' is hydrogen or an ester- or salt-forming radical, $R^1$ is an alkyl group containing 1 to 4 carbon atoms, and $R^2$ has the same meaning as $R^1$ or stands for hydrogen.

Among those N-acyl derivatives which are covered by the above formula and are prepared according to the present invention, particularly 6-(α-phenoxypropionamido)-penicillanic acid and 6-(α-phenoxyisobutyramido)-penicillanic acid as well as salts and esters thereof should be mentioned.

The primary characteristic feature of the process of the invention consists in using a p-nitrophenyl ester of the formula $$C_6H_5O-\underset{R^2}{\overset{R^1}{\underset{|}{\overset{|}{C}}}}-CO-O-\underset{}{\bigcirc}-NO_2$$

where $R^1$ and $R^2$ are as defined above as acylating agent.

It is true that it has previously been proposed to prepare p-nitrophenyl esters of N-blocked amino acids and to let these esters react with another amino acid thereby forming a peptide bond. It has, however, so far been held necessary to protect the carboxy group of the last mentioned amino acid by esterification. This special measure has been found to be quite unnecessary when p-nitrophenyl esters of the above formula are used for acylating 6-amino-penicillanic acid.

A further characteristic feature of the process of the invention consists in adding a tertiary amine as a catalyst for the acylation process. It has, in fact, been found that by this measure there may be obtained a quite considerable increase of the yields which may hereby be brought up to 75 to 95 percent of the theoretical yield, or even more. This effect could not be foreseen as the acylation process hitherto known using p-nitrophenyl esters runs in a satisfactory manner without the use of any catalyst.

The tertiary amine used as catalyst may be identical with or different from the tertiary amine which forms part of the tertiary ammonium salt of 6-amino-penicillanic acid used. As examples of suitable tertiary amines there may be mentioned trialkyl amines preferably containing up to four carbon atoms in the alkyl group, as well as N-methyl piperidine and N-methyl morpholine.

During the acylation process p-nitrophenol is liberated and according to the invention this compound is preferably removed by dissolving the reaction mixture in water after removal of the employed organic solvent by distillation, whereafter the aqueous solution is adjusted to a pH of 4.5 to 5.5, preferably 5, and the p-nitrophenol is removed by extraction with an organic solvent such as ether.

The acylation process of the invention may be carried out in various organic solvents such as pyridine, dimethyl formamide, chloroform, and dioxane.

The following examples further illustrate the invention.

EXAMPLE 1

*The Sodium Salt of 6-(α-Phenoxypropionamido)-Penicillanic Acid*

2.9 g. of the p-nitrophenyl ester of α-phenoxypropionic acid are mixed in 25 ml. of dry pyridine with 1.0 g. triethyl amine and 1.0 g. 6-amino-penicillanic acid with a purity of 85 percent. Following stirring for some time and standing at room temperature for 15 to 18 hours the pyridine is removed by distillation in vacuum, the residue is dissolved in 70 ml. of water, and the pH of the solution is adjusted to 5. The solution is extracted three times with ether and the separated and collected aqueous solutions are acidified to a pH of about 2 and extracted with chloroform. 50 ml. of water are added to the chloroform phase and the pH in the water phase is brought up to 7 by the addition of a solution of sodium bicarbonate. This procedure is repeated with more water (30 ml.). The collected neutral water phases containing the sodium salt of 6-(α-phenoxypropionamide)-penicillanic acid are freeze-dried and the sodium salt is obtained in a yield of 94 percent.

EXAMPLE 2

*The Sodium Salt of 6-(α-Phenoxyisobutyramido) Penicillanic Acid*

3.0 g. of the p-nitrophenyl ester of α-phenoxy isobutyric acid are mixed in 25 ml. of dry dimethyl formamide with 1.0 g. triethyl amine and 1.0 g. of 85 percent pure 6-amino-penicillanic acid. Following stirring for some time and standing at room temperature for 18 hours the dimethyl formamide is removed by distillation, and the residue is worked up as described in Example 1. The sodium salt of 6-(α-phenoxyisobutyramido)-penicillanic acid is obtained in a yield of 77 percent.

Having now fully described my invention I claim as new and desire to secure by Letters Patent:

1. A process for preparing N-acyl-6-amino-penicillanic acid derivatives of the formula $$\bigcirc-O-\underset{R^2}{\overset{R^1}{\underset{|}{\overset{|}{C}}}}-CO-NH-CH-\overset{S}{\underset{CO-N}{\overset{}{\underset{|}{CH}}}}\overset{}{\underset{CHCOOR'}{\overset{C-(CH_3)_2}{}}}$$

where R' is a substituent selected from the group consisting of hydrogen, lower alkyl, and pharmaceutically acceptable cations, $R^1$ is alkyl of 1 to 4 carbon atoms, and $R^2$ is a substituent selected from the group consisting of hydrogen and alkyl of 1 to 4 carbon atoms, which comprises reacting a derivative of 6-amino-penicillanic acid of the formula

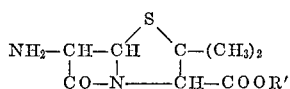

where R' is as already defined, in an inert organic solvent with a p-nitrophenyl ester of the formula

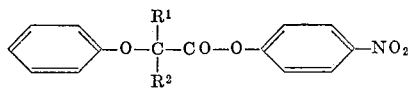

where $R^1$ and $R^2$ are as already defined, in the presence of a tertiary amine catalyst selected from the group consisting of tertiary alkyl amines of up to 4 carbon atoms in the alkyl group, N-methylpiperidine, and N-methylmorpholine.

2. A process according to claim 1, comprising the further steps of distilling off said inert organic solvent from said reaction mixture, dissolving the thus-produced solvent-free reaction mixture in an aqueous medium, adjusting the pH of said aqueous medium to the range of 4.5 to 5.5 and separating by extraction the p-nitrophenol formed during the reaction from the aqueous solution of N-acyl-6-amino-penicillanic acid derivative.

3. A process for preparing N-acyl-6-amino-penicillanic acid derivatives of the formula

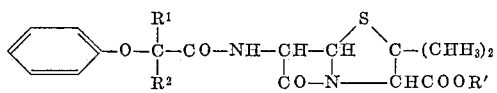

where R' is a substituent selected from the group consisting of hydrogen, lower alkyl, and pharmaceutically acceptable cations, $R^1$ is alkyl of 1 to 4 carbon atoms, and $R^2$ is a substituent selected from the group consisting of hydrogen and alkyl of 1 to 4 carbon atoms, which comprises reacting a tertiary amine salt of 6-amino-penicillanic acid, where said tertiary amine salt radical is selected from the group consisting of tertiary alkyl amines of up to 4 carbon atoms in the alkyl group, N-methylpiperidine, and N-methylmorpholine, in an inert organic solvent with a p-nitrophenylester of the formula

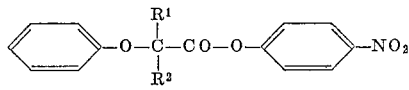

in which $R^1$ and $R^2$ are as already defined, in the presence of a tertiary amine catalyst selected from the group consisting of tertiary alkyl amines of up to 4 carbon atoms in the alkyl group, N-methylpiperidine, and N-methylmorpholine.

4. A process according to claim 3, comprising the further steps of distilling off said inert organic solvent from said reaction mixture, dissolving the thus-produced solvent-free reaction mixture in an aqueous medium, adjusting the pH of said aqueous medium to the range of 4.5 to 5.5, and separating by extraction the p-nitrophenol formed during the reaction from the aqueous solution of N-acyl-6-amino-penicillanic acid derivative.

5. In a process for preparing N-acyl-6-amino-penicillanic acid derivatives of the formula

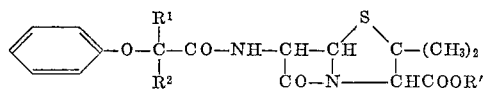

where R' is a substituent selected from the group consisting of hydrogen, lower alkyl, and pharmaceutically acceptable cations, $R^1$ is alkyl of 1 to 4 carbon atoms, and $R^2$ is a substituent selected from the group consisting of hydrogen and alkyl of 1 to 4 carbon atoms by the reaction of 6-amino-penicillanic acid derivatives of the formula

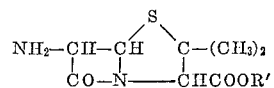

where R' is as already defined, and p-nitrophenyl esters of the formula

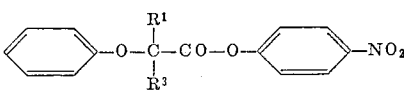

where $R^1$ and $R^2$ are as already described, the improvement which comprises the use of a tertiary amine catalyst for the reaction selected from the group consisting of tertiary alkyl amines of up to 4 carbon atoms in the alkyl group, N-methylpiperidine, and N-methylmorpholine.

6. In a process of making N-acyl derivatives of 6-amino-penicillanic acid of the formula

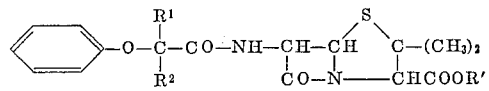

where R' is a substituent selected from the group consisting of hydrogen, lower alkyl, and pharmaceutically acceptable cations, $R^1$ is alkyl of 1 to 4 carbon atoms, and $R^2$ is a substituent selected from the group consisting of hydrogen and alkyl of 1 to 4 carbon atoms, in which a solution of a tertiary ammonium salt of 6-amino-penicillanic acid in an inert organic solvent is reacted with a p-nitrophenyl ester of the formula

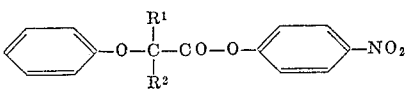

where $R^1$ and $R^2$ are as defined above, the improvement which comprises using as a catalyst for the reaction a tertiary amine selected from the group consisting of tertiary alkyl amines of up to 4 carbon atoms in the alkyl group, N-methylpiperidine, and N-methylmorpholine.

7. In a process according to claim 6, the improvement comprising the further steps of distilling off said organic solvent, dissolving the reaction mixture in an aqueous medium, adjusting said aqueous medium to a pH of 4.5 to 5.5, and removing p-nitrophenol by extraction with an organic solvent.

References Cited by the Examiner
UNITED STATES PATENTS 3,025,290   3/62   Doyle et al. _____ 260—239.1

OTHER REFERENCES

Morton: The Chemistry of Heterocyclic Compounds, page VI of the preface (1946).

Advances in Catalysis, volume I, pages VII, VIII and IX of the preface (1948).

NICHOLAS S. RIZZO, *Primary Examiner*.